United States Patent
Reene

(10) Patent No.: US 8,140,285 B2
(45) Date of Patent: Mar. 20, 2012

(54) COMPASS SYSTEM AND METHOD FOR DETERMINING A REFERENCE FIELD STRENGTH

(75) Inventor: Jason L. Reene, Holland, MI (US)

(73) Assignee: Johnson Controls Technology Company, Holland, MI (US)

( * ) Notice: Subject to any disclaimer, the term of this patent is extended or adjusted under 35 U.S.C. 154(b) by 424 days.

(21) Appl. No.: 12/415,570

(22) Filed: Mar. 31, 2009

(65) Prior Publication Data

US 2010/0250176 A1   Sep. 30, 2010

(51) Int. Cl.
*G06C 17/38* (2006.01)
*G06F 19/00* (2011.01)

(52) U.S. Cl. ............... 702/92; 33/333; 33/356
(58) Field of Classification Search ......... 702/85, 702/92, 141, 150; 33/326, 333, 356, 361; 73/1
See application file for complete search history.

(56) References Cited

U.S. PATENT DOCUMENTS

| | | | | |
|---|---|---|---|---|
| 4,327,498 A | * | 5/1982 | Setter et al. | 33/333 |
| 5,065,521 A | * | 11/1991 | Waldrop et al. | 33/361 |
| 5,131,154 A | * | 7/1992 | Schierbeek et al. | 33/356 |
| 7,826,999 B1 | * | 11/2010 | Boeen et al. | 33/356 |
| 2002/0083605 A1 | | 7/2002 | Blank et al. | |
| 2008/0201096 A1 | * | 8/2008 | Wright et al. | 702/92 |

* cited by examiner

*Primary Examiner* — John H Le
(74) *Attorney, Agent, or Firm* — Foley & Lardner LLP

(57) ABSTRACT

A compass system includes a magnetic field sensor for measuring an ambient magnetic field and a magnetic field generator, corresponding to the magnetic field sensor, configured to generate a reference magnetic field. The magnetic field sensor is configured to measure the reference magnetic field. The compass system further includes a control circuit operably connected to the magnetic field sensor and magnetic field generator, wherein the control circuit is configured to process the ambient magnetic field and the reference magnetic field measurements to determine an absolute reference field strength for use in calibrating the compass system.

16 Claims, 3 Drawing Sheets

COMPASS SYSTEM AND METHOD FOR DETERMINING A REFERENCE FIELD STRENGTH

FIELD OF INVENTION

The present invention relates to a compass system, including a compass system that determines a reference field strength, as well as a method for determining a reference field strength, and particularly those for use in vehicles.

BACKGROUND

The following description is provided simply as an aid in understanding the disclosure and is not admitted to describe or constitute prior art.

A compass is a navigational instrument for determining direction relative to the earth's magnetic poles. Accordingly, vehicle manufacturers commonly include a compass in vehicles to assist the driver with navigation. Generally, modern compasses include several magnetic field sensors. Like any magnetic device, compasses are affected by nearby ferrous materials as well as by strong local electromagnetic forces. In particular, a vehicle's magnetic field and/or other vehicle components may distort compass measurements. For example, sunroofs or window defrosters can generate enough localized distortion to adversely affect the compass' ability to measure the Earth's magnetic field and determine a heading.

Current compass systems continuously monitor and adjust to changes in the ambient magnetic field caused by vehicle systems. When changes in the ambient magnetic field are large and unpredictable it becomes difficult for traditional compass systems to adjust to these changes. Thus, an improved system and method for calibrating a vehicle compass to ensure correct measurements is needed.

SUMMARY

According to one embodiment, a compass system includes a magnetic field sensor for measuring an ambient magnetic field, a magnetic field generator, corresponding to the magnetic field sensor, configured to generate a reference magnetic field, a control circuit, operably connected to the magnetic field sensor and magnetic field generator, wherein the magnetic field sensor is configured to measure the reference magnetic field and the control circuit is configured to process the measured ambient magnetic field and the reference magnetic field to determine an absolute reference field strength for use in calibrating the compass system.

According to another embodiment, a method for determining a reference field strength measurement for a compass system, includes the steps of measuring an ambient magnetic field with at least a magnetic field sensor, generating a reference magnetic field, measuring a combination of the ambient magnetic field and the reference magnetic field and determining an absolute reference field strength based at least on the measured ambient magnetic field and reference magnetic field.

According to still another embodiment, a vehicle compass system, includes a magnetic field sensor configured to sense Earth's magnetic field and to generate orientation signals representative of the orientation of the magnetic field sensor with respect to Earth's magnetic field, a magnetic field generator configured to generate a reference magnetic field; and a control circuit configured to generate a heading based on measurements of the Earth's magnetic field and the reference magnetic field.

Alternative exemplary embodiments relate to other features and combinations of features as may be generally recited in the claims.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Referring generally to the figures, a compass system is described that includes a magnetic field sensor and a magnetic field generator. The magnetic field sensor may be configured to measure an ambient magnetic field. The magnetic field generator corresponds to the magnetic field sensor and may generate a reference magnetic field. The magnetic field sensor may be configured to also measure the reference magnetic field. The measured ambient magnetic field and reference magnetic field may then be used for calibrating the compass system.

Figure 1:
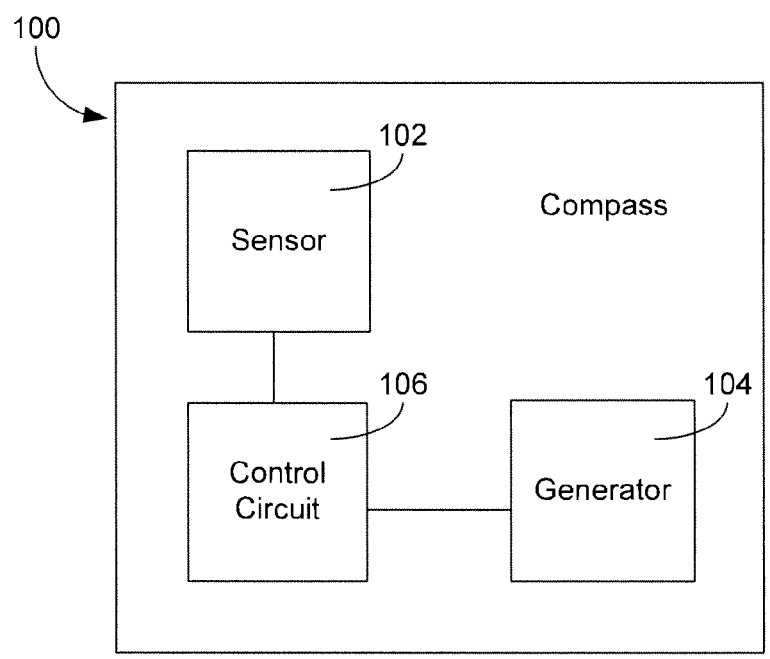
FIG. 1 is a block diagram of a compass system, according to an exemplary embodiment.

Referring to FIG. 1, a block diagram of a compass system 100 is shown, according to an exemplary embodiment. Compass system 100 generally includes a magnetic field sensor 102, a magnetic field generator 104, and a control circuit 106. According to an exemplary embodiment, compass system 100 may be a vehicle compass system.

Figures 2A, 2B:
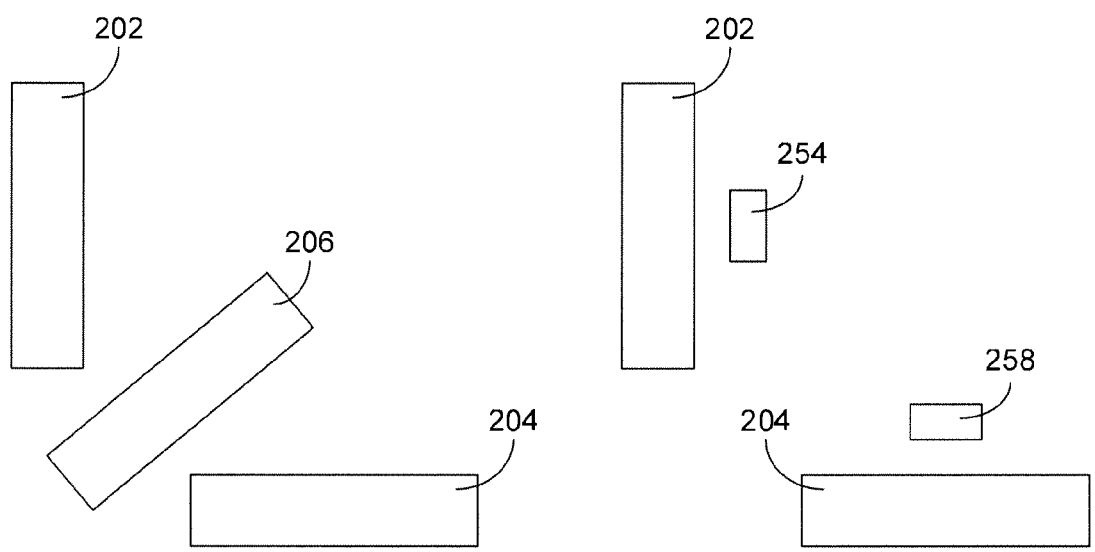
FIG. 2A is a block diagram of a configuration of magnetic field sensors for generating and measuring a reference magnetic field, according to an exemplary embodiment.
FIG. 2B is a block diagram of a configuration of magnetic field sensors for generating and measuring a reference magnetic field, according to another exemplary embodiment.

According to exemplary embodiments, the magnetic field sensor 102 may be configured to generate orientation signals representative of the geographical orientation of the magnetic field sensor 102 with respect to Earth's magnetic field. For example, the magnetic field sensor 102 may comprise at least two electromagnetic coils 202, 204, as shown in the embodiments of FIGS. 2A and 2B. The two magnetic coils 202, 204 may be oriented approximately perpendicular (i.e., at a right angle) such that magnetic field sensor 102 may measure the magnitude and polarity of the ambient magnetic field that exists in the two directions the coils are aligned in. A proportional difference may then be used to calculate the direction of the field (e.g., if the ambient field is in a direction closer to the first coil 202 that the second coil 204, the first coil would detect a larger intensity field than the second coil 204).

As described above, electromagnetic coils 202, 204 of the magnetic field sensor 102 may be configured to measure the ambient magnetic field (e.g., including the Earth's field and other locally generated fields and/or interference). In addition, electromagnetic coils 202, 204 of the magnetic field sensor 102 may be configured to measure a reference magnetic field. The magnetic field sensor 102 may be configured, for example, to measure the combined ambient magnetic field and reference magnetic field.

According to exemplary embodiments, the reference magnetic field can be generated by the magnetic field generator 104. The magnetic field generator 104 may be excited, for example, by a variable current source (not shown). The current source may include discrete hardware and feedback and control circuitry such that the source may be controlled by the software of compass system 100. The field strength generated by the magnetic field generator 104 preferably is a small fraction of the Earth's field (approximately 100-400 mG), but the field strength may vary in order to determine and apply a useful measurement range.

As shown in the exemplary embodiment of FIG. 2A, the magnetic field generator 104 may comprise at least one electromagnetic coil 206 to generate the reference magnetic field. According to this embodiment, electromagnetic coil 206 of the magnetic field generator 104 may be placed at approximately a forty-five degree (45°) angle to coils 202, 204 of the magnetic field sensor 102, such that a magnetic field generated by coil 206 may be detected by both coils 202, 204. According to another exemplary embodiment, electromagnetic coil 206 of the magnetic field generator 104 may be placed at any angle in reference to coils 202, 204 of the magnetic field sensor 102. Electromagnetic coils 202, 204 may be referred to as "primary" coils and electromagnetic coil 206 may be referred to as a "secondary" coil. For example, in the embodiment of FIG. 2A, electromagnetic coil 206 may generate a field of strength x and electromagnetic coils 202, 204 may measure a field of strength with a magnitude of 0.707x (as coil 206 is at a forty-five degree angle to coils 202, 204) with a polarity that would depend on the directions of the various currents and the way in which each coil 206 was wound. According to an exemplary embodiment, coil 206 may be a bare coil (e.g., a coil with no core material) such that when coil 206 is not in use, coil 206 will not affect any measurements taken by coils 202, 204.

As shown in the exemplary embodiment of FIG. 2B, the magnetic field generator 104 may comprise at two electromagnetic coils 254, 258. Each of the electromagnetic coils 254, 258 (e.g., secondary coils) of the magnetic field generator 104 may be placed near and associated with a corresponding one of the electromagnetic coils 202, 204 (e.g., primary coils) of the magnetic field sensor 102. In this embodiment, the electromagnetic coils 254, 258 of the magnetic field generator 104 are positioned in parallel to its corresponding electromagnetic coils 202, 204 of the magnetic field sensor 102. Preferably, the electromagnetic coils 254, 258 of the magnetic field generator 104 are smaller and each generate a smaller reference magnetic field that can only be detected by its corresponding one of the electromagnetic coils 202, 204 of the magnetic field sensor 102. According to an exemplary embodiment, secondary coils 254, 258 may be operated in conjunction with one another to provide various magnetic field levels to primary coils 202, 204. In this embodiment, compass system 100 may be capable of various test procedures to improve the accuracy of the compass system 100 while it is in use. For example, the configuration of the coils in FIG. 2B is similar to a "miniature" Helmholtz coil allowing for onboard testing of compass system 100.

In the embodiments of FIGS. 2A and 2B, the secondary coil(s) 206, 254, 258 may be placed close to the primary coils 202, 204 such that a generation of a required field strength may be done with the lowest practical amount of current. The material of the secondary coil(s) 206, 254, 258 may be nonferrous such that the coil(s) do not interfere with the ambient magnetic field being sensed by the magnetic field sensor 102. When not active, the secondary coil(s) 206, 254, 258 are transparent to ambient magnetic fields.

In the embodiments of FIGS. 2A and 2B, the secondary coils 206, 254, 258 correspond to primary coils 202, 204 configured to measure the reference magnetic field and an ambient magnetic field. According to one embodiment, the secondary coils 206, 254, 258 are positioned adjacent to primary coils 202, 204. According to another exemplary embodiment (not shown), secondary coils may be physically attached to their corresponding primary coil (e.g., coil 206 is attached to coils 202, 204, coil 254 is attached to coil 202, and coil 258 is attached to coil 204). The secondary coil may be wound around the outside of the winding of the primary coil as long as the coils are electrically isolated from one another. Such a configuration may result in producing an ideal field on the primary coil 202, 204, 202, 204.

Control circuit 106 may be coupled to magnetic field sensor 102 and magnetic field generator 104 and be configured to receive measurements (e.g. magnetic field measurements) from magnetic field sensor 102 and magnetic field generator 104 of the compass system 100. The measurements may include a reference magnetic field generated by magnetic field generator 104, an ambient magnetic field (e.g., the magnetic field measured by sensor 102 that includes auxiliary components such as interference or locally generated fields in addition to the Earth's magnetic field), or other measurements. Control circuit 106 may generally include a processor, memory, and other components for processing, storing, or otherwise using the received measurements.

Control circuit 106 may process the measurements and determine an absolute reference field strength using the measurements. The determined absolute reference field strength may be used to calibrate the compass system 100 and improve the functionality of compass system 100. Control circuit 106 may further be configured to generate a heading based on measurements of the Earth's magnetic field and reference magnetic field as provided by magnetic field sensor 102 and magnetic field generator 104. A diagram for a system for determining the absolute reference field strength is shown in greater detail in FIG. 3.

Figure 3:
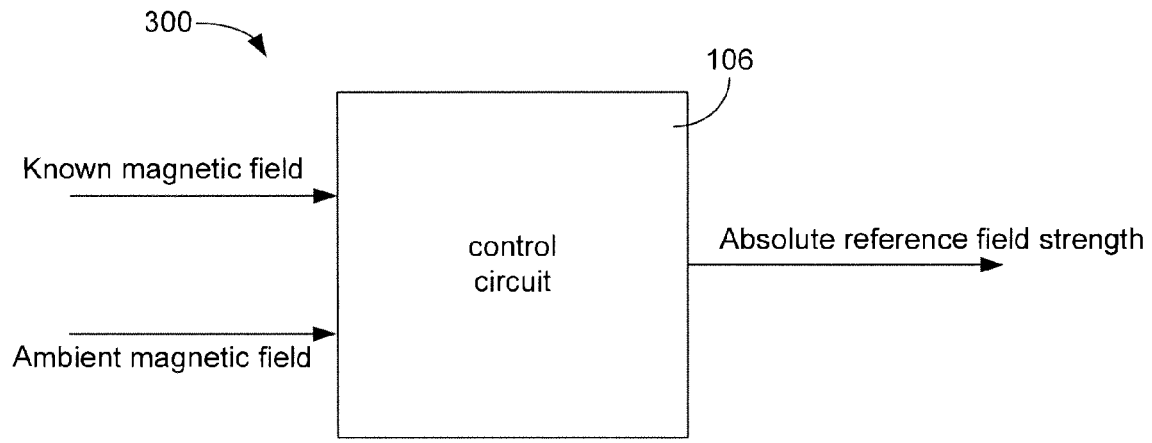
FIG. 3 is a block diagram of a system for determining an absolute reference field strength, according to an exemplary embodiment.

Referring to FIG. 3, a block diagram of a system 300 of determining an absolute reference field strength is shown, according to an exemplary embodiment. System 300 may be executed by a control circuit or other circuitry of a compass system (e.g., control circuit 106 of compass system 100 of FIG. 1). The inputs of system 300 may include a measurement relating to a known magnetic field obtained by a magnetic field sensor (e.g., a generated reference magnetic field by magnetic field generator 104 of FIG. 1). The inputs of system 300 may further include a measurement relating to a measured ambient magnetic field (e.g., a measure ambient magnetic field including the generated reference magnetic field, the Earth's magnetic field, other local fields generated by auxiliary components, and other interference by sensor 102 of FIG. 1).

System 300 may calculate or determine an absolute reference field strength using the various inputs to the system. According to one exemplary embodiment, the absolute reference field strength may be determined by calculating a difference between the ambient field input and the ambient field input combined with the known magnetic field input. According to another exemplary embodiment, the absolute reference field strength may be determined by calculating a difference between an ambient magnetic field input when the electromagnetic coils of magnetic field generator 104 are "off" or deactivated and an ambient magnetic field input when the coils of magnetic field generator 104 are "on" or activated.

The absolute reference field strength is based on current flowing through the secondary coil and the number of turns of wire that the coil makes, in addition to other factors (e.g., the material used for the coil winding substrate, the method of providing current to the coil, etc.). The compass system may use the absolute reference field strength to determine how to scale readings received from the primary sensors (sensor 102). According to one exemplary embodiment, the difference between two generated reference magnetic fields may be used to determine the scaling of sensor 102 (i.e., determine the ratio of input to output intensity). According to another exemplary embodiment, compass system 100 can sweep the reference field between two extremes, and use the resulting data to determine the linearity of the sensitivity of the sensor in relation to the ambient field strength.

Figure 4:
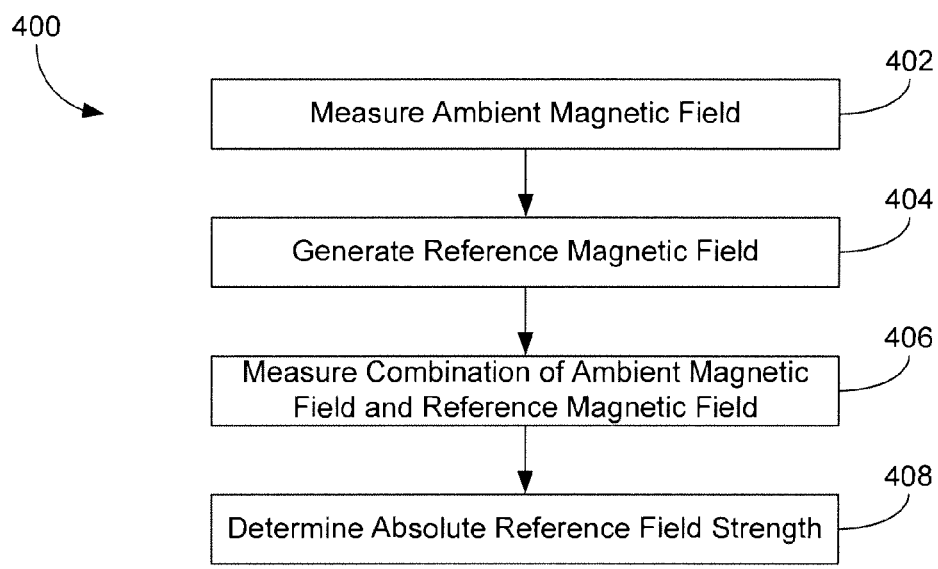
FIG. 4 is a flow chart of a process for determining an absolute reference field strength, according to an exemplary embodiment.

Referring also to FIG. 4, a flow chart of a process 400 for determining an absolute reference field strength is shown, according to an exemplary embodiment. An ambient magnetic field is measured (step 402) by, for example, the magnetic field sensor 102 of FIG. 1. A reference magnetic field is generated (step 404) by, for example, the magnetic field generator 104 of FIG. 1. The combined ambient magnetic field and reference magnetic field are then measured (step 406) by, for example, the magnetic field sensor 102 of FIG. 1. Then, the magnetic fields measured in step 402, 406 are used to determine an absolute reference field strength (step 408). According to an exemplary embodiment, system 300 may be used to execute step 408.

The absolute reference field strength determined in step 408 may generally be used to calibrate the compass, according to an exemplary embodiment. The compass is capable of generating its own reference magnetic field of known intensity; therefore, the value may be determined during process 400 or another calculation without relying on any pre-data (e.g., on tests on the compass performed in manufacturing the compass, not having to store a known magnetic field measurement in memory of the control circuit of the compass, not having to adjust the pre-data for various scale factors, etc.).

Figure 5:
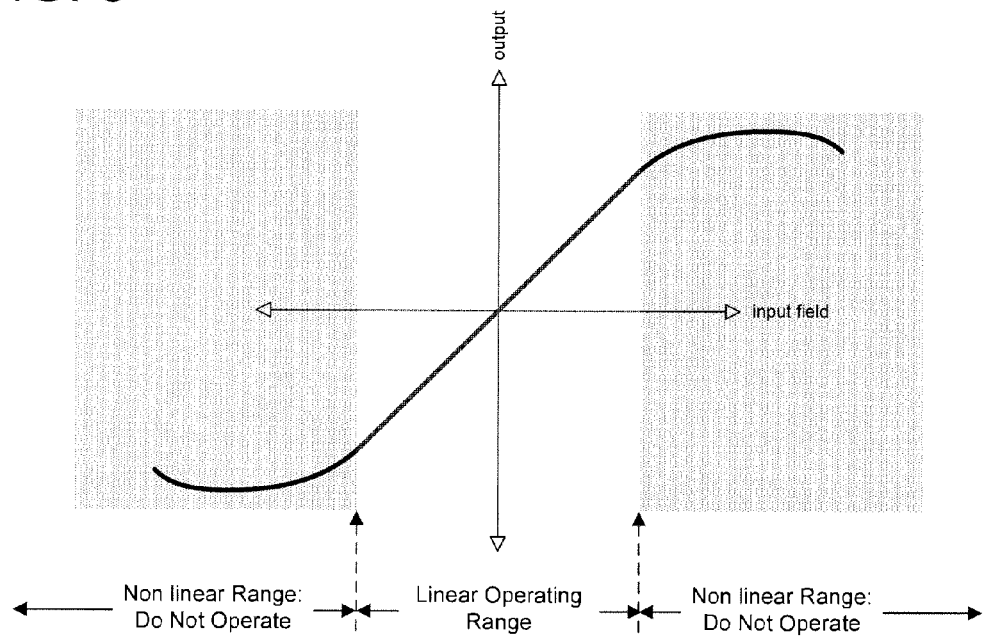
FIG. 5 is a graph of magnetic field sensor behavior for a conventional compass system.

For example, conventional compass systems use magnetic sensors to measure the Earth's magnetic field. During production, the magnetic sensors are tested to determine their sensitivity and their linear operating region (linearity). The conventional compass system is designed to operate in the sensor's linear region. The sensitivity of a sensor can be adjusted during operation to compensate for minor changes in the ambient magnetic field. In addition, degaussing may be performed to eliminate an unwanted magnetic field. However, during operation extreme ambient magnetic fields (due to vehicle magnetization, temperature, etc.) cause the sensor to operate outside of the linear region. FIG. 5 is a graph showing the behavior of a magnetic field sensor in a conventional compass sensor. FIG. 5 denotes the linear and non linear operating ranges of the compass sensor. When the sensor ceases to operate linearly, its readings can no longer be relied upon to generate accurate compass information. Accordingly, conventional compass systems are configured to provide readings only when its sensors operate within a certain predefined linear operating range. This range is predetermined and fixed during production testing.

Figure 6:
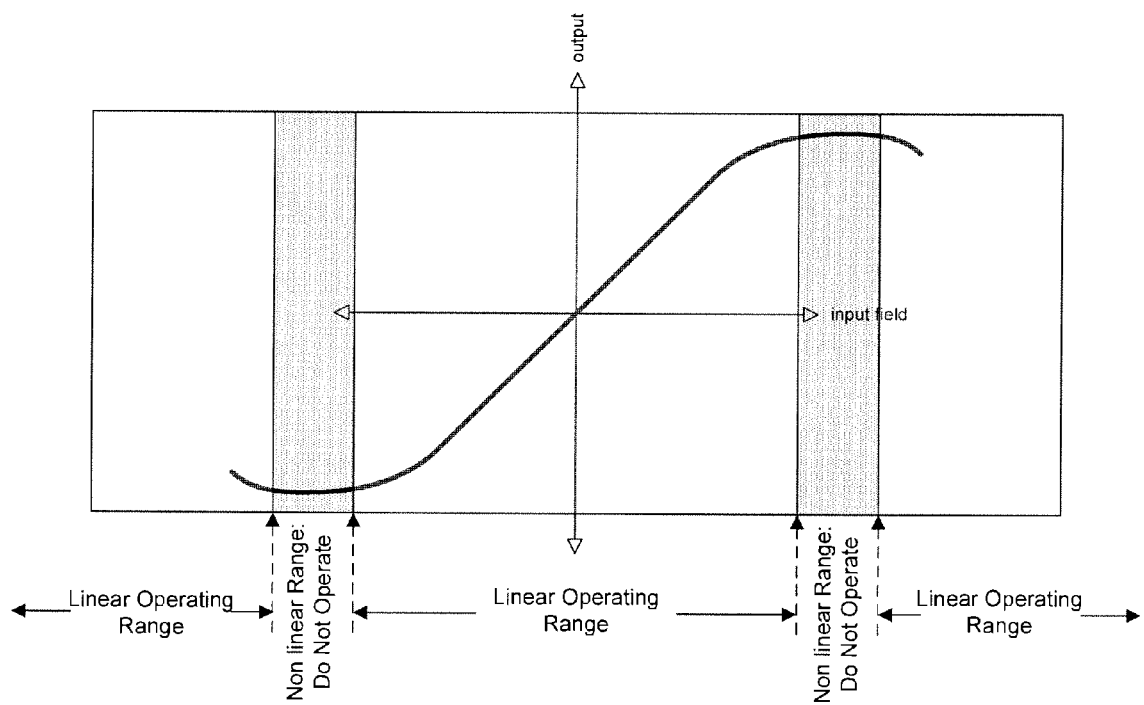
FIG. 6 is a graph of magnetic field sensor behavior for the compass system, according to an exemplary embodiment.

In contrast, the operation of compass system 100 is not limited to a predefined linear operating range. The compass system 100 can routinely conduct linearity tests on magnetic field sensors 202 and 204 during operation using the magnetic field generator (204, 254, 258). By routinely measuring sensor linearity at a current operating point, the compass system 100 can compensate for changes in the slope of the linearity of a magnetic field sensor in its calculations. In turn, instead of operating within a narrower predefined linear range, the compass system 100 has an increased useful operating range. According to an exemplary embodiment, FIG. 6 is a graph of the behavior of a magnetic field sensor in the compass system 100. As shown in FIG. 6, the magnetic filed sensor of compass system 100 has a larger linear operating region than that of the compass sensor shown in FIG. 5. Accordingly, the above-described compass system 100 is configured to maintain accurate compass readings in conditions in which a conventional compasses' performance would degrade.

While the exemplary embodiments illustrated in the figures and described herein are presently preferred, it should be understood that the embodiments are offered by way of example only. Accordingly, the present application is not limited to a particular embodiment, but extends to various modifications that nevertheless fall within the scope of the appended claims. For example, a method may be shown with a specific order of steps, but the order of the steps may differ, two or more steps may be performed concurrently or with partial concurrence, etc.

The construction and arrangement of the compass system as shown in the various exemplary embodiments is illustrative only. Although only a few embodiments have been described in detail in this disclosure, many modifications are possible (e.g., variations in sizes, dimensions, structures, shapes and proportions of the various elements of the compass system, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. Other substitutions, modifications, changes, and omissions may be made in the design, operating conditions and arrangement of the exemplary embodiments without departing from the scope of the present disclosure.

What is claimed is:

1. A compass system, comprising:
    a magnetic field sensor for measuring an ambient magnetic field;
    a magnetic field generator, corresponding to the magnetic field sensor, configured to generate a reference magnetic field;
    a control circuit, operably connected to the magnetic field sensor and magnetic field generator, wherein the magnetic field sensor is configured to measure the reference magnetic field and the control circuit is configured to process the measured ambient magnetic field and the reference magnetic field to determine an absolute reference field strength for use in calibrating the compass system.

2. The compass system as claimed in claim 1, wherein the magnetic field sensor comprises at least two electromagnetic coils.

3. The compass system as claimed in claim 2, wherein the at least two electromagnetic coils of the magnetic field sensor are positioned perpendicular to each other.

4. The compass system as claimed in claim 3, wherein the magnetic field generator is positioned at approximately a forty-five (45°) degree angle relative to each of the at least two electromagnetic coils of the magnetic field sensor.

5. The compass system as claimed in claim 2, wherein the magnetic field generator comprises at least two second electromagnetic coils, wherein each second electromagnetic coil is positioned in proximity to one of the at least two electromagnetic coils of the magnetic field sensor.

6. The compass system as claimed in claim 1, wherein the magnetic field generator includes at least one electromagnetic coil.

7. A method for determining a reference field strength measurement for a compass system, comprising:
   measuring an ambient magnetic field with at least a magnetic field sensor;
   generating a reference magnetic field;
   measuring a combination of the ambient magnetic field and the reference magnetic field; and
   determining an absolute reference field strength based at least on the measured ambient magnetic field and reference magnetic field.

8. The method of claim 7, wherein the reference magnetic field is generated by a magnetic field sensor.

9. The method of claim 7, wherein the ambient magnetic field is a measurement of the earth's magnetic field in combination with a magnetic field generated by auxiliary components.

10. The method of claim 7, wherein the determining step comprises calculating a difference between the measured ambient magnetic field and the measured combination of the ambient magnetic field and the reference magnetic field.

11. A vehicle compass system, comprising:
   a magnetic field sensor configured to sense Earth's magnetic field and to generate orientation signals representative of the orientation of the magnetic field sensor with respect to Earth's magnetic field;
   a magnetic field generator configured to generate a reference magnetic field; and
   a control circuit configured to generate a heading based on the sensed Earth's magnetic field and the generated reference magnetic field.

12. The vehicle compass system as claimed in claim 11, wherein the magnetic field sensor comprises at least two electromagnetic coils.

13. The vehicle compass system as claimed in claim 12, wherein the at least two electromagnetic coils of the magnetic field sensor are positioned perpendicular to each other.

14. The vehicle compass system as claimed in claim 13, wherein the magnetic field generator is positioned at approximately a forty-five (45°) degree angle relative to each of the at least two electromagnetic coils of the magnetic field generator.

15. A vehicle compass system as claimed in claim 12, wherein the magnetic field generator comprises at least two second electromagnetic coils, wherein each second electromagnetic coil is positioned in proximity to one of the at least two electromagnetic coils of the magnetic field sensor.

16. The vehicle compass system as claimed in claim 11, wherein the magnetic field generator includes at least one electromagnetic coil.

* * * * *